Patented Mar. 10, 1942

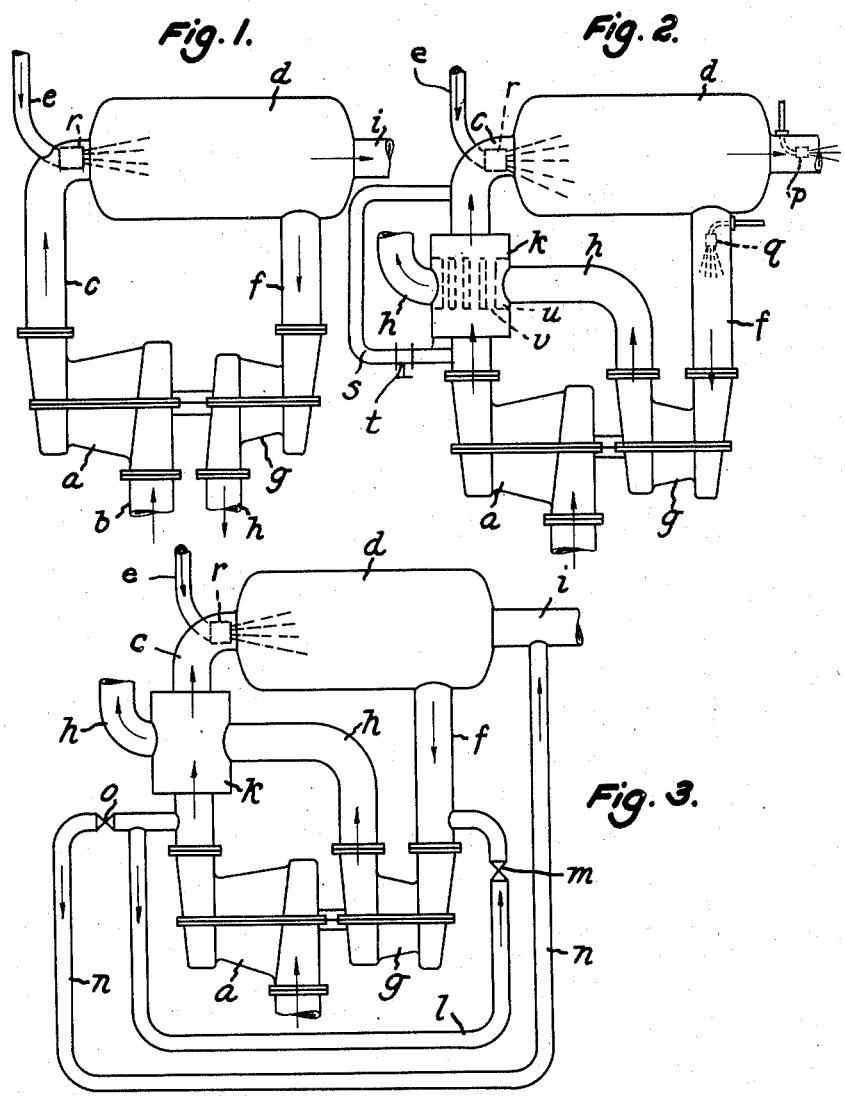

2,275,543

UNITED STATES PATENT OFFICE 2,275,543

CONSTANT PRESSURE GAS TURBINE

Adolf Meyer, Kusnacht by Zurich, Switzerland, assignor to Aktiengesellschaft Brown, Boveri & Cie, Baden, Switzerland, a joint-stock company Application July 16, 1940, Serial No. 345,803
In Germany July 24, 1939

9 Claims. (Cl. 263—19)

It is known that the compressor required to produce the combustion and cooling air for gas turbines with constant pressure combustion can also be employed to produce at the same time compressed air for any other purpose. Thus, for instance, in blast furnace installations the compressor for the blast air can be combined with the gas turbine compressor. Although the driving gas is then generally produced in a combustion chamber and the blast air heated in a specially heated blast heater, it has also been proposed to combine the heating place of the blast heater with the combustion chamber of the gas turbine either by subjecting the heating surfaces of the upper stage of the blast heater to a stream of heating gases from the combustion chamber of the gas turbine or to locate these heating surfaces directly inside the combustion chamber itself.

The present invention concerns a further advance in this direction and according to the invention the driving gases for the gas turbine and also the hot gases intended for any other purpose are produced in the same combustion chamber. These hot gases will mostly consist of hot air such as is used for instance in blast furnaces or for other reduction processes, or also for combustion or heating processes in the metallurgical and chemical industries.

This combination is possible because with these gases the amount of pure air considerably exceeds the quantity of the combustion products and also in many cases, for instance when smelting low-grade ores, blast temperatures are required which are not much higher than the present day driving gas temperatures for the gas turbine. Furthermore the pressures required for the gas turbine are similar to the pressures used in many cases where hot compressed air is employed.

The high air content of the driving gases of constant pressure gas turbine is due to the fact that these turbines operate with cooling air in order that the high combustion temperature, for instance 1800° C., can be reduced to a temperature of about 500° C. which is allowable for the blade material. With one kilogram combustion air there can be as much as four times the amount of cooling air. If the gas turbine is used for instance for driving a blast compressor for a blast furnace, an additional three kilograms of air are required for each kilogram of combustion air. The proportion of carbon dioxide or the shortage of oxygen in the combustion gas and air mixture resulting from the combustion is so small that in many cases this does not cause any disadvantage. The great advantage of the arrangement according to the invention is the saving of a special heat exchanger for the hot air, so that the costs of the plant are reduced, its operation simplified, and any considerable heat losses and flow resistances avoided.

The objects and advantages of the invention will be apparent from the following specification when taken with the accompanying drawing in which:

Fig. 1 is a diagrammatic representation of one embodiment of the invention;

Fig. 2 a diagrammatic representation of a further embodiment of the invention with preheating; and Fig. 3 a modified form of the invention shown diagrammatically.

The simplicity of the whole arrangement is obvious from Fig. 1 where the compressor $a$ takes from the atmosphere at $b$ the total amount of air required for the combustion air, cooling air and useful hot air, compresses it and passes it through the pipe $c$ to the combustion chamber $d$, this latter also being supplied through pipe $e$ with fuel, for instance blast furnace gas. The fuel issues from nozzle $r$ and is burned in the combustion chamber. The major portion of the hot gases passes from the combustion chamber $d$ through pipe $f$ to the gas turbine $g$ and from there to the atmosphere at $h$ or to a chimney, whilst the smaller portion passes through pipe $i$ to the consumer, for instance, a blast furnace.

The arrangement according to the invention can be employed to special advantage if preheating by means of exhaust gases is used. Not only will the efficiency of the plant be considerably improved by recuperating the heat from the exhaust gases, but this preheating enables the amount of fuel required to be reduced and therefore the combustion gas and air mixture contain less impurities ($CO_2$ and $N$). This can be of primary importance in connection with some uses to which hot air is put.

An arrangement of such a plant is illustrated in Fig. 2, where $a$ agains denotes the compressor, $g$ the turbine and $d$ the combustion chamber. The hot exhaust gas is passed through pipe $h$ to the preheater $k$ and its heat is transferred to the air which flows through the preheater and enters the combustion chamber $d$ by way of the pipe $c$. Preheater $k$, showing the internal structure in dotted lines, is provided with passages $v$ for the compressed air and, separate therefrom, with passages $u$ for the turbine exhaust gases.

All or only a part of the air can be preheated. Suitable means for passing part of the compressed air around preheater $k$ is by-pass $s$ controlled by valve $t$. This preheater can be made large because it is simpler and considerably cheaper than the heat exchanger, referred to hereinbefore, which is eliminated by the arrangement according to the invention, this being due to the lower temperatures involved, thus enabling ordinary steel or iron to be used for the construction of the preheater.

Certain cases may occur where it is desirable to have a different temperature for the useful air (in case of the blast for a blast furnace) than that which the driving gas of the gas turbine must have to correspond to a given turbine output. In such an event the arrangement shown in Fig. 3 can be employed. When it is desired that the turbine driving gas be cooler than the useful gas, cold air is supplied through pipe $l$ and the regulating valve $m$ to the gases passing from the combustion chamber to the turbine. On the other hand, when it is desired that the useful gas be cooler than the turbine driving gas, cold air is supplied through pipe $n$ and the regulating valve $o$ to the useful gases being withdrawn at $i$.

It is furthermore also possible to provide the useful air or the driving air with additional heat by supplying a supplementary quantity of fuel to this air through additional nozzles $p$ or $q$ (Fig. 2).

I claim:

1. A process for providing hot gases under pressure for metallurgical and similar uses by means of a system including an air compressor, a constant pressure hot gas turbine in driving relation with said compressor, and a combustion chamber, which comprises supplying fuel to said combustion chamber, supplying to said combustion chamber from said air compressor air in amount sufficient for the combustion of said fuel together with an excess of air including an amount of air sufficient to provide at least a substantial portion of the hot gas required for use externally of said system, passing a portion of the products of combustion and admixed air as driving gases to said gas turbine and withdrawing the remaining portion of the products of combustion and admixed air as useful hot gas for use externally of said system.

2. A process for providing hot gases under pressure for metallurgical and similar uses by means of a system including an air compressor, a constant pressure hot gas turbine in driving relation with said compressor, and a combustion chamber, which comprises supplying fuel to said combustion chamber, supplying to said combustion chamber from said air compressor air in amount sufficient for the combustion of said fuel together with an excess of air including an amount of air sufficient to provide at least a substantial portion of the hot gas required for use externally of said system, passing a portion of the products of combustion and admixed air as driving gases to said gas turbine, withdrawing the remaining portion of the products of combustion and admixed air as useful hot gas for use externally of said system, and passing the exhaust gases from said turbine in indirect heat exchange relation with at least a portion of the compressed air being supplied to said combustion chamber from said air compressor for preheating said air.

3. A process for providing hot gases under pressure for metallurgical and similar uses by means of a system including an air compressor, a constant pressure hot gas turbine in driving relation with said compressor, and a combustion chamber, which comprises supplying fuel to said combustion chamber, supplying to said combustion chamber from said air compressor air in amount sufficient for the combustion of said fuel together with an excess of air including an amount of air sufficient to provide at least a substantial portion of the hot gas required for use externally of said system, passing a portion of the products of combustion and admixed air as driving gases to said gas turbine, withdrawing the remaining portion of the products of combustion and admixed air as useful hot gas for use externally of said system, withdrawing a portion of the compressed air being supplied to said combustion chamber from said air compressor and mixing said withdrawn air with said useful hot gas for cooling and diluting the latter.

4. A process for providing hot gases under pressure for metallurgical and similar uses by means of a system including an air compressor, a constant pressure hot gas turbine in driving relation with said compressor, and a combustion chamber, which comprises supplying fuel to said combustion chamber, supplying to said combustion chamber from said air compressor air in amount sufficient for the combustion of said fuel together with an excess of air including an amount of air sufficient to provide at least a substantial portion of the hot gas required for use externally of said system, passing a portion of the products of combustion and admixed air as driving gases to said gas turbine, withdrawing the remaining portion of the products of combustion and admixed air as useful hot gas for use externally of said system, withdrawing a portion of the compressed air being supplied to said combustion chamber from said air compressor and mixing said withdrawn air with said turbine driving gases on their way to the gas turbine for cooling and diluting said driving gases.

5. A process for providing hot gases under pressure for metallurgical and similar uses by means of a system including an air compressor, a constant pressure hot gas turbine in driving relation with said compressor, and a combustion chamber, which comprises supplying fuel to said combustion chamber, supplying to said combustion chamber from said air compressor air in amount sufficient for the combustion of said fuel together with an excess of air including an amount of air sufficient to provide at least a substantial portion of the hot gas required for use externally of said system, passing a portion of the products of combustion and admixed air as driving gas to said gas turbine, withdrawing the remaining portion of the products of combustion and admixed air as useful hot gas for use externally of said system, passing the exhaust gases from said turbine in indirect heat exchange relation with at least a portion of the compressed air being supplied to said combustion chamber from said air compressor for preheating said air, withdrawing a portion of the unpreheated compressed air being supplied to said combustion chamber from said air compressor and mixing said withdrawn air with said driving gases on their way to the gas turbine for cooling and diluting said gases.

6. A process for providing hot gases under pressure for metallurgical and similar uses by means of a system including an air compressor, a constant pressure hot gas turbine in driving relation with said compressor, and a combustion chamber, which comprises supplying fuel to said combustion chamber, supplying to said combustion chamber from said air compressor air in amount sufficient for the combustion of said fuel together with an excess of air including an amount of air sufficient to provide at least a substantial portion of the hot gas required for use externally of said system, passing a portion of the products of combustion and admixed air as driving gas to said gas turbine, withdrawing the remaining portion of the products of combustion and admixed air as useful hot gas for use externally of said system, passing the exhaust gases from said turbine in indirect heat exchange relation with at least a portion of the compressed air being supplied to said combustion chamber from said air compressor for preheating said air, withdrawing a portion of the unpreheated compressed air being supplied to said combustion chamber from said air compressor and mixing said withdrawn air with said useful hot gas for cooling and diluting the latter.

7. A process for providing hot gases under pressure for metallurgical and similar uses by means of a system including an air compressor, a constant pressure hot gas turbine in driving relation with said compressor, and a combustion chamber, which comprises supplying fuel to said combustion chamber, supplying to said combustion chamber from said air compressor air in amount sufficient for the combustion of said fuel together with an excess of air including an amount of air sufficient to provide at least a substantial portion of the hot gas required for use externally of said system, passing a portion of the products of combustion and admixed air as driving gases to said gas turbine, withdrawing the remaining portion of the products of combustion and admixed air as useful hot gas for use externally of said system, and further heating said turbine driving gases by combustion of fuel therein.

8. A process for providing hot gases under pressure for metallurgical and similar uses by means of a system including an air compressor, a constant pressure hot gas turbine in driving relation with said compressor, and a combustion chamber, which comprises supplying fuel to said combustion chamber, supplying to said combustion chamber from said air compressor air in amount sufficient for the combustion of said fuel together with an excess of air including an amount of air sufficient to provide at least a substantial portion of the hot gas required for use externally of said system, passing a portion of the products of combustion and admixed air as driving gases to said gas turbine, withdrawing the remaining portion of the products of combustion and admixed air as useful hot gas for use externally of said system, and further heating said useful hot gas by combustion of fuel therein.

9. Apparatus for providing hot gases under pressure for metallurgical and similar uses which comprises a combustion chamber, a constant pressure hot gas turbine, an air compressor in driven relation to said hot gas turbine, means for supplying fuel to said combustion chamber, means for supplying compressed air to said combustion chamber from said air compressor in an amount sufficient for the combustion of said fuel together with an excess of air sufficient to form a substantial portion of the hot gases required to drive said turbine and for use externally of said apparatus, means for supplying a portion of the products of combustion and admixed air from said combustion chamber to said turbine for driving the latter, and means for withdrawing the remaining portion of the products of combustion and admixed air from said combustion chamber for use externally of said apparatus.

ADOLF MEYER.